(12) United States Patent
Meyer et al.

(10) Patent No.: US 6,920,702 B2
(45) Date of Patent: Jul. 26, 2005

(54) COOLING GRID FOR BULK MATERIAL

(75) Inventors: Hartmut Meyer, Thomasburg (DE); Thomas Staak, Hamburg (DE); Dominique Brunet, Hollenstedt (DE); Ulrich Möller, Moorrege (DE)

(73) Assignee: Claudius Peters Technologies GmbH, Buxtehude (DE)

( * ) Notice: Subject to any disclaimer, the term of this patent is extended or adjusted under 35 U.S.C. 154(b) by 0 days.

(21) Appl. No.: 10/473,128

(22) PCT Filed: Apr. 5, 2002

(86) PCT No.: PCT/EP02/03804

§ 371 (c)(1),
(2), (4) Date: Apr. 12, 2004

(87) PCT Pub. No.: WO02/081994

PCT Pub. Date: Oct. 17, 2002

(65) Prior Publication Data

US 2004/0168336 A1 Sep. 2, 2004

(30) Foreign Application Priority Data

Apr. 6, 2001 (DE) .......................... 101 17 226

(51) Int. Cl.[7] ............................... F26B 19/00
(52) U.S. Cl. .............................. 34/206; 34/62; 34/203; 34/236; 414/157
(58) Field of Search ........................... 34/545, 62, 203, 34/205, 206, 90, 208, 236; 414/157, 158, 159, 749.6

(56) References Cited

U.S. PATENT DOCUMENTS 2,904,323 A * 9/1959 Cova et al. ............... 432/58
3,010,218 A * 11/1961 Sylvest ..................... 34/164
5,895,213 A * 4/1999 Sutoh et al. ............... 432/77
6,312,253 B1 * 11/2001 Fons et al. ................ 432/78
6,796,141 B2 * 9/2004 Kastingschafer et al. ..... 62/378

FOREIGN PATENT DOCUMENTS

| JP | 55-041310 | 3/1980 |
| JP | 57-007226 | 1/1982 |
| WO | WO 98/48231 | 10/1998 |

OTHER PUBLICATIONS

English Translation of International Preliminary Examination Report for PCT/EP02/03804 dated Apr. 15, 2003.

* cited by examiner

Primary Examiner—Denise L. Esquivel
Assistant Examiner—Kathryn S. O'Malley
(74) Attorney, Agent, or Firm—Morrison & Foerster LLP

(57) ABSTRACT

A cooling grate for bulk material, having a carrying plate for accommodating a layer of the material for cooling, and having conveying elements by means of which the material for cooling is conveyed in a conveying direction on the resting carrying plate and which comprise pushers, which are arranged in a movable manner on that side of the carrying plate which is subjected to the action of material for cooling, and a drive, which is arranged on the other side of the carrying plate and is intended for executing a lifting movement, each pusher being assigned an opening in the carrying plate and a transmission member, which is guided thereby and connects the pusher to the drive. The carrying plate is provided, at the openings, with in each case one collar, which at least at the front and rear, as seen in the conveying direction, has a seal acting between the transmission member and collar.

8 Claims, 4 Drawing Sheets

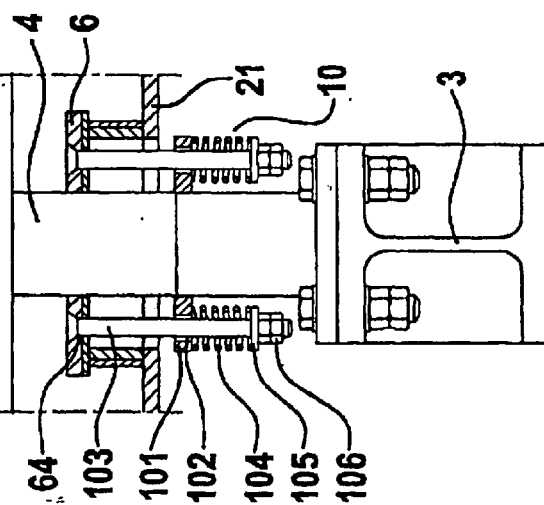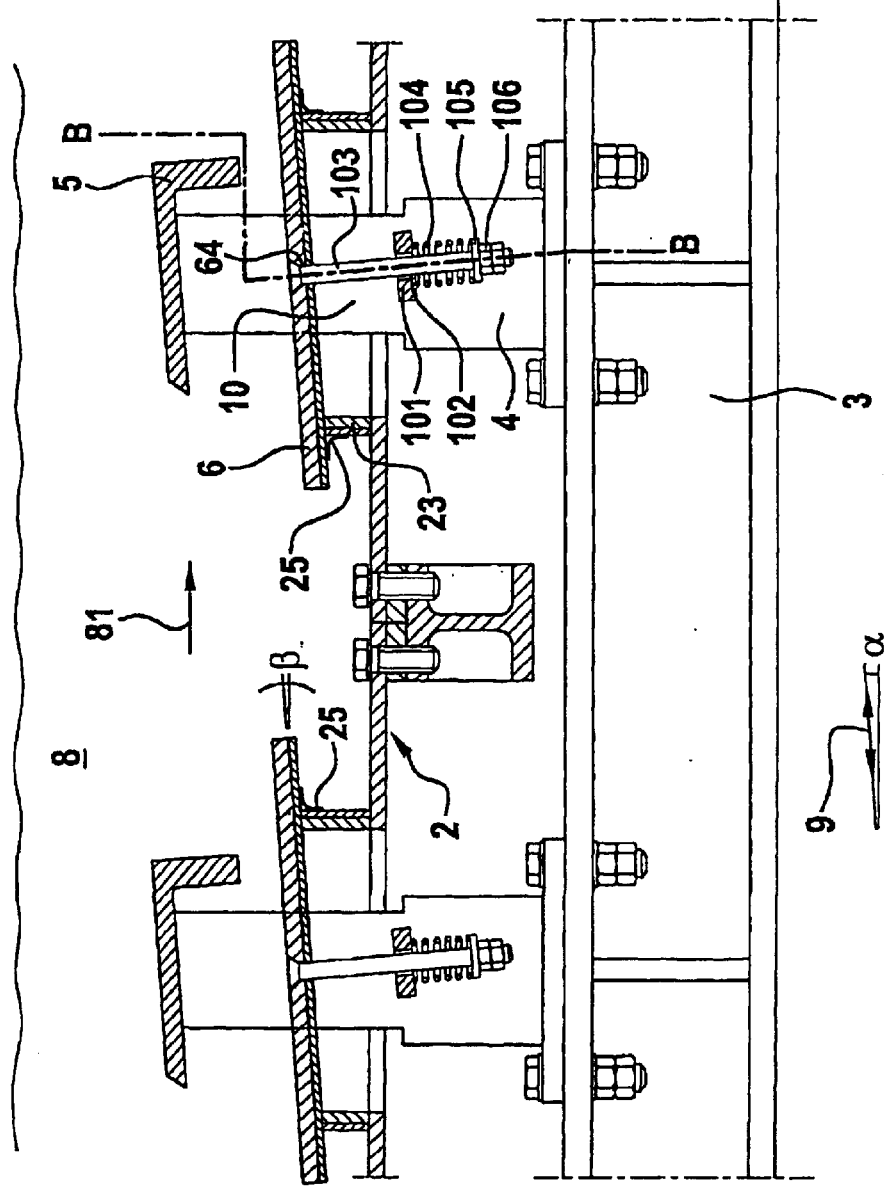

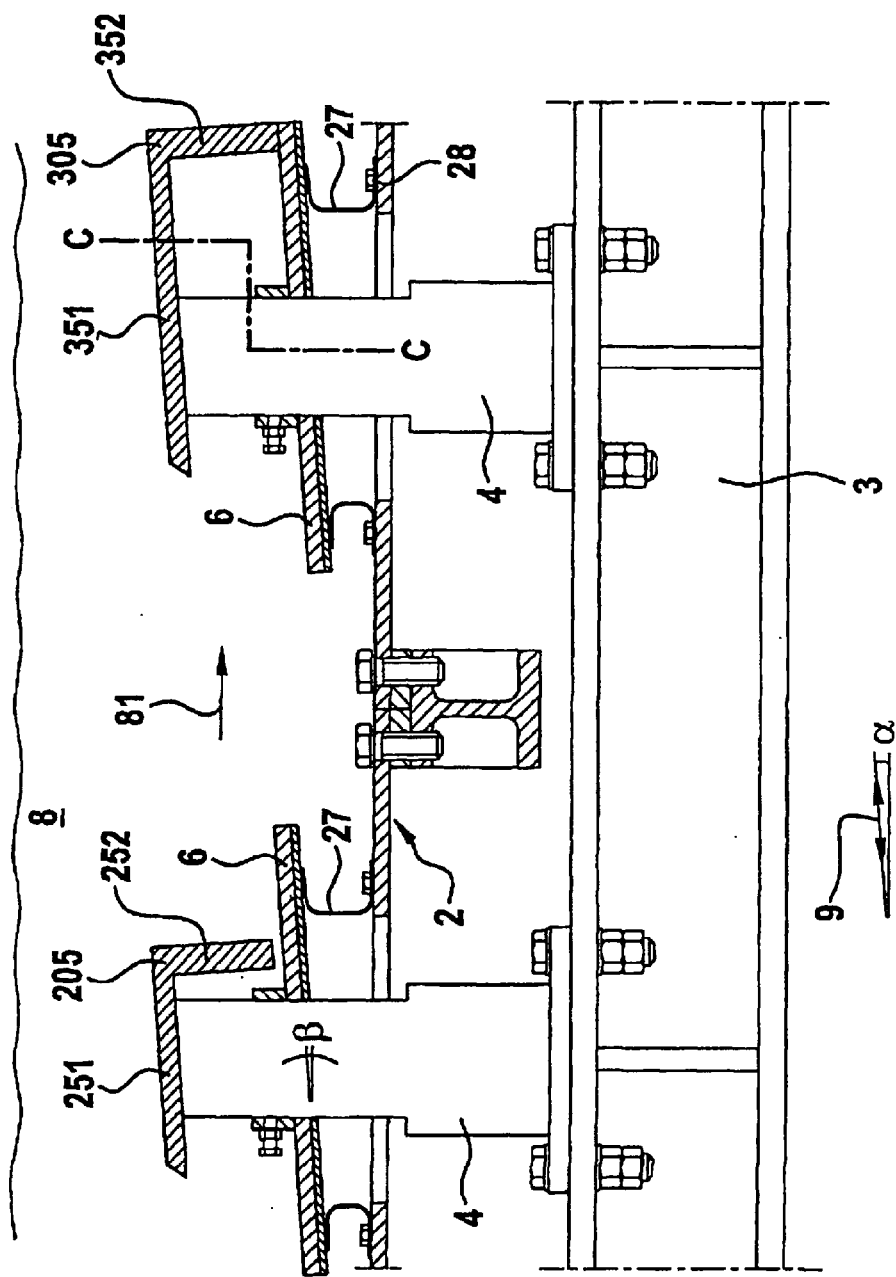
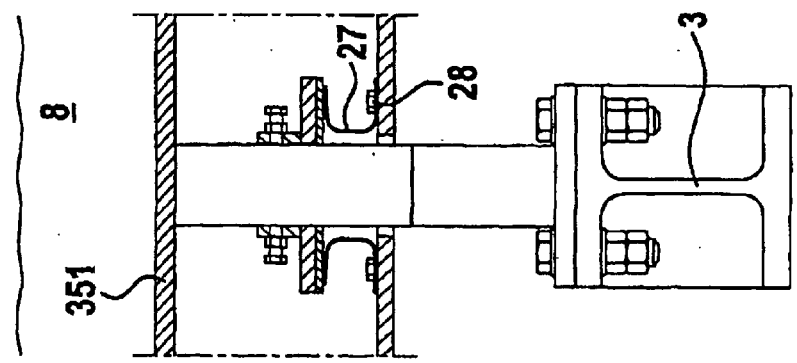

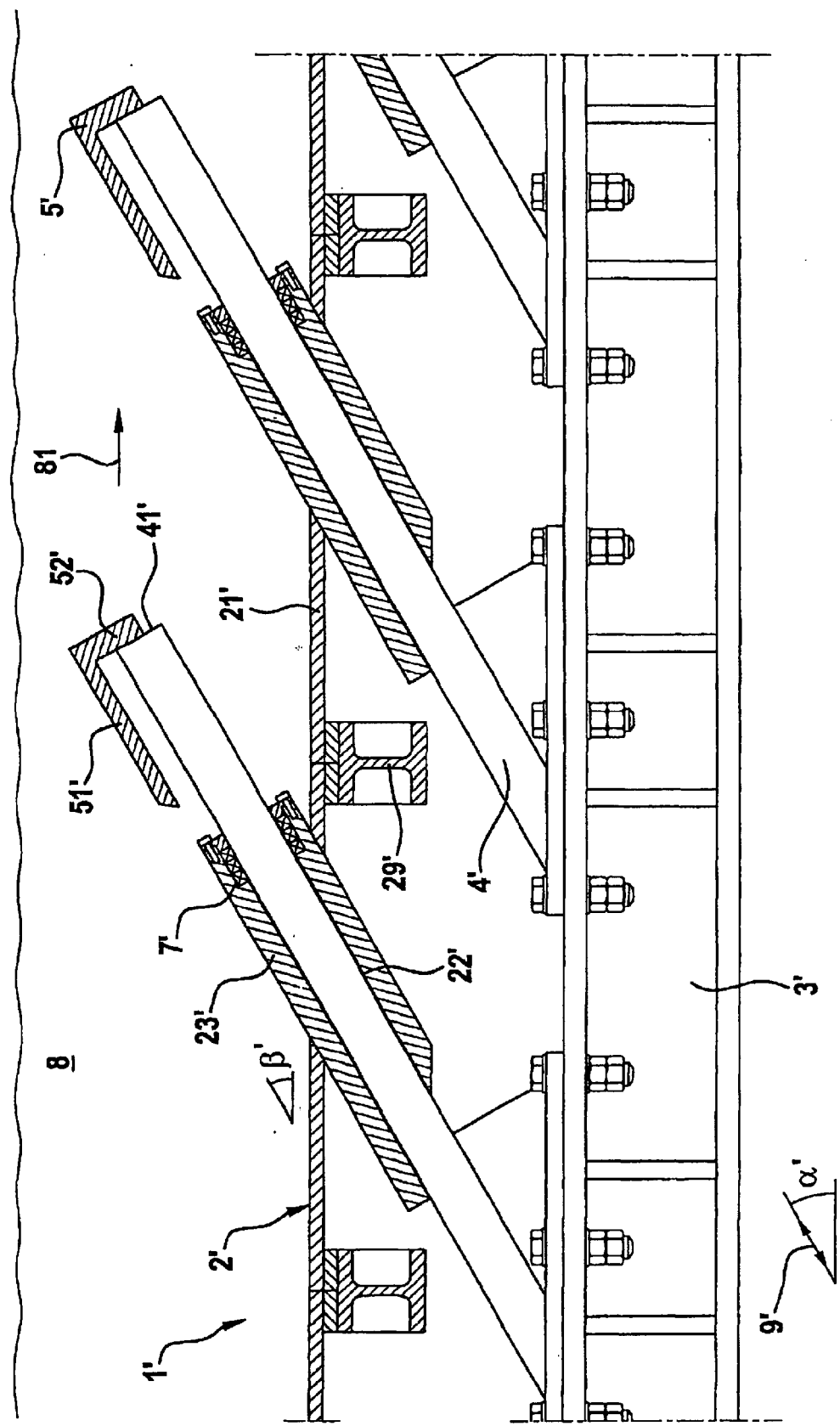

COOLING GRID FOR BULK MATERIAL

FIELD AND BACKGROUND OF THE INVENTION

The invention relates to a cooling grate for bulk material, having a carrying plate for accommodating a layer of the material for cooling, and having conveying elements by means of which the material for cooling is transported in a conveying direction on the resting carrying plate and which has pushers, which are arranged in a movable manner on that side of the carrying plate which is subjected to the action of the material for cooling, and a drive, which is arranged on the other side of the carrying plate and is intended for executing a lifting movement, each pusher being assigned an opening in the carrying plate and a transmission member, which is guided thereby and connects the pusher to the drive.

Cooling grates which are constructed as a push grate comprising a plurality of rows, running transversely to the conveying direction, of grate plates which are alternately arranged in a fixed manner and such that they can be moved back and forth in the conveying direction are known. The material for cooling is transported in the conveying direction by the reciprocating movement of the movable grate plates. On account of some of the grate plates being arranged in a movable manner, the operation of supplying them with cooling gas involves high outlay. Moreover, the movable grate plates are subjected to considerable wear. Also known are cooling grates in which the material is advanced on a stationary carrying plate by a conveying system. The conveying system has pushers which run transversely to the conveying direction and are either moved continuously in the conveying direction or are driven in a reciprocating manner. The invention is concerned with the construction with reciprocating pushers.

U.S. Pat. No. 3,010,218 discloses a cooling grate of this type, in the case of which there is arranged on the carrying plate, which bears the material for cooling, a row of pushers which are shaped in a wedge-like manner and can be moved back and forth along the surface of the carrying plate. Beneath the pushers, openings, through which a respective bolt is guided, are provided in the carrying plate in each case. This bolt has its top end arranged on the pusher and its bottom end arranged on the drive frame. The bolts serve for transmitting the reciprocating movement of the drive frame to the pushers. A similar cooling grate is known from U.S. Pat. No. 2,904,323. The disadvantage with these known cooling grates is that the pushers have an insufficient conveying action and the quantity of material for cooling which falls through the openings is undesirably high.

In the case of the cooling grate according to WO 98/48231, the pushers are arranged such that they can be moved back and forth. The drive frame for the pushers is arranged beneath the carrying plate. In order to connect the drive frame to the pushers, two parallel transmission plates are provided, these extending in the conveying direction over the entire length of the carrying plate, having their bottom end connected to the drive frame and having the pushers arranged at their top end. In order for it to be possible for the transmission plates to be guided from the pushers on the top side to the drive frame on the underside of the carrying plate, the latter is provided with corresponding slots which run in the conveying direction and likewise extend in the conveying direction over the entire length of the carrying plate. The carrying plate has upright panels extending laterally on the slots in the direction of the pushers. Arranged on the top side of the transmission plate is a U-profile, of which the legs extend in the direction of the carrying plate and engage over the upright panels. The gap which is produced here between the legs of the U-profile and the upright panels is intended to serve as sealing in relation to material for cooling penetrating into the slot through the cooling grate. The disadvantage with this known cooling grate is that, as a result of the slots extending over the entire length of the cooling grate, it is not possible for any cooling gas to be blown through the cooling grate at these locations. The material for cooling which is located above the slots and/or the transmission plates is thus only cooled to an insufficient extent. This results in an undesirably non-uniform cooling result. It is also disadvantageous that the transmission plate passes through all the temperature zones of the cooling grate and is thus exposed to pronounced thermal stressing, which may result in non-uniform warping of the transmission plate.

Taking U.S. Pat. No. 3,010,218 as the departure point, the object of the invention is to provide a cooling grate with a conveying system of the type mentioned in the introduction in the case of which the mixing action and the sealing in relation to material for cooling falling through are improved, without this adversely affecting the cooling result in the process.

SUMMARY OF THE INVENTION

The solution according to the invention resides in a cooler having the features of the invention as broadly described herein. Advantageous developments can be gathered from the preferred embodiments.

It is accordingly provided, in the case of a grate cooler of the type mentioned in the introduction, that the carrying plate is provided, at the openings, with in each case one collar, which at least at the front and rear, as seen in the conveying direction, has a seal acting between the transmission member and collar.

The invention has found that, by virtue of a collar with a seal at the openings in the carrying plate, better sealing of the openings in relation to material for cooling falling through can be achieved by virtue of the seal arranged on the collar and, at the same time, a better conveying action of the pushers is achieved. The latter is brought about in that, on account of the height of the collars, the pushers are spaced apart from the carrying plate, that is to say they project further into the bed formed by the material for cooling. In addition, the collars have the advantage that they protect the transmission members against contact with the material for cooling. It is thus the case that, during their reciprocating movement, the transmission members, at most, need only make their way through the material for cooling by part of their length which extends outside the collar in the direction of the pusher. This reduces the wear and the amount of power needed for the drive. It is particularly expedient if the lifting movement takes place in a direction which is inclined by an angle of elevation á out of the plane of the carrying plate. It is thus the case that the pushers, during their lifting movement, move not only with a horizontal direction component, but also with a vertical direction component. Better mixing of the material for cooling is achieved by this movement, which is inclined in relation to the carrying plate. This is because the material for cooling, which is located on the carrying plate, does not move uniformly in the conveying direction; rather, zones of different transporting speeds form, with a rest zone in a region in the vicinity of the carrying plate. By virtue of the inclination, material is transported upward from the rest zone, located at the bottom, into the moving zone, and vice versa. Said better mixing action is achieved without this being at the cost of the disadvantage of increased drive power. This is because an obliquely upwardly directed lifting movement at least partially raises the material for cooling in the region in front of the pusher, as a result of which the frictional resistance of the material for cooling which is located in front of the pusher is reduced.

The seal is expediently [lacuna] by a border of the collar and a cover plate, which is arranged on the transmission member and is inclined out of the plane of the carrying plate by a setting angle â which is equal to the angle of elevation á. By interacting with the collar, the cover plate prevents, in an effective manner, material for cooling penetrating into the collar and thus material for cooling falling through the opening onto the underside of the carrying plate. As a result of the inclined arrangement of the cover plate on the transmission member, the cover plate always follows its own path during the lifting movement. This achieves the situation where, on the one hand, the resistance produced by the displacement of the cover plate in the bed of the material for cooling is minimized and, on the other hand, the plate is at a constant spacing from the border of the collar, this ensuring good sealing in each phase of the lifting movement.

For this purpose, a clamping device is preferably provided on the transmission member in order to brace the cover plate with the collar. This increases the reliability of the cover plate being retained in a position in relation to the collar which is necessary for reliable sealing. This is important, in particular, if, on account of unavoidable tolerances or on account of the influence of thermal expansion, in particular of the transmission member or of the collar, the sealing conditions between the cover plate and collar were otherwise to change. Good sealing continues to be achieved, however, even when the carrying plate, on account of the differences in temperature, deforms and the position of the collars thus changes.

It is also expedient, in order to improve the sealing between the cover plate and collar, if resilient seals which interact with the cover plate are arranged on the collar. Although sufficient sealing can be achieved in most cases by conventional sealing surfaces, it may be recommended in a number of cases to provide resilient plates, in addition, in order to improve the sealing action. This is recommended, in particular, in order to compensate for changes in spacing between the cover plate and the collar if no clamping device is provided. Although it is often favorable, for wear-related reasons, if the resilient plates are arranged in an exchangeable manner on the collar, it is also possible, for easier production and assembly, for them to be configured integrally with the collar.

As an alternative, it may also be provided that the collars are inclined by the setting angle â, which is equal to the angle of elevation á, and that in each case one of the transmission members is guided in a longitudinally movable manner in one of the collars. This achieves a configuration of the pusher drive which is particularly favorable in terms of wear. The transmission members follow their own path throughout the lifting movement and thus need not displace any material for cooling. Furthermore, during the forward-travel movement, there are no spaces which can be released by the transmission member and subsequently filled with material for cooling, which would have to be displaced again, with high outlay, during the rearward travel. It is thus possible to realize a particularly low-wear conveying system which manages with only a small amount of drive power.

A seal packing which interacts with the transmission member is expediently provided on the collar. Although this is not absolutely necessary, since the material for cooling is moved away from the border of the collar by the transmission members during the forward-travel movement of the latter, thus minimizing the risk of material for cooling penetrating in an undesirable manner in this phase, it may be the case during the rearward-travel movement, on account of material for cooling adhering to the transmission member, that a small quantity of material for cooling could be introduced into the collar. This can be prevented in an effective manner by a seal packing on the collar.

BRIEF DESCRIPTION OF THE DRAWINGS

The invention is explained hereinbelow with reference to the drawing, which illustrates advantageous exemplary embodiments and in which:

FIG. 3 shows a sectional view of a second exemplary embodiment of the invention;

FIG. 4 shows a sectional view along the line B—B from FIG. 3;

FIG. 5 shows a sectional view of a third exemplary embodiment of the invention;

FIG. 6 shows a sectional view along line C—C from FIG. 5; and

FIG. 7 shows a sectional view of a fourth exemplary embodiment of the invention.

DETAILED DESCRIPTION OF THE INVENTION

It should be assumed, for the sake of simplicity, that all of the following exemplary embodiments relate to a cooling grate for a cooler which has cooling gas flowing through it from bottom to top and, in the process, serves for cooling hot material, in particular cement clinker or other particulate bulk material.

Figure 2:
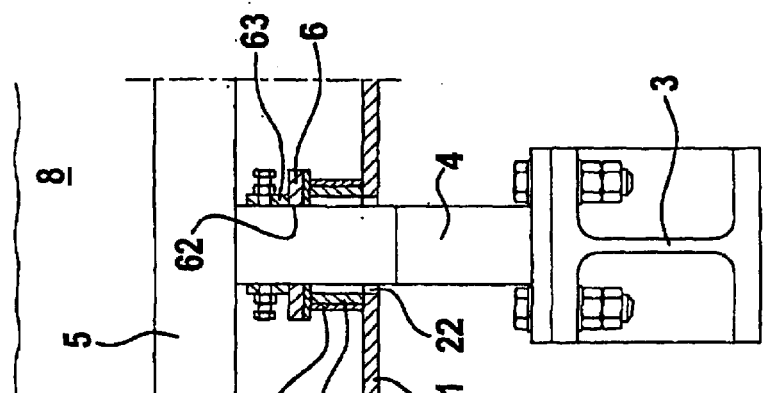
FIG. 2 shows a sectional view along line A—A from FIG. 1.
Figure 1:
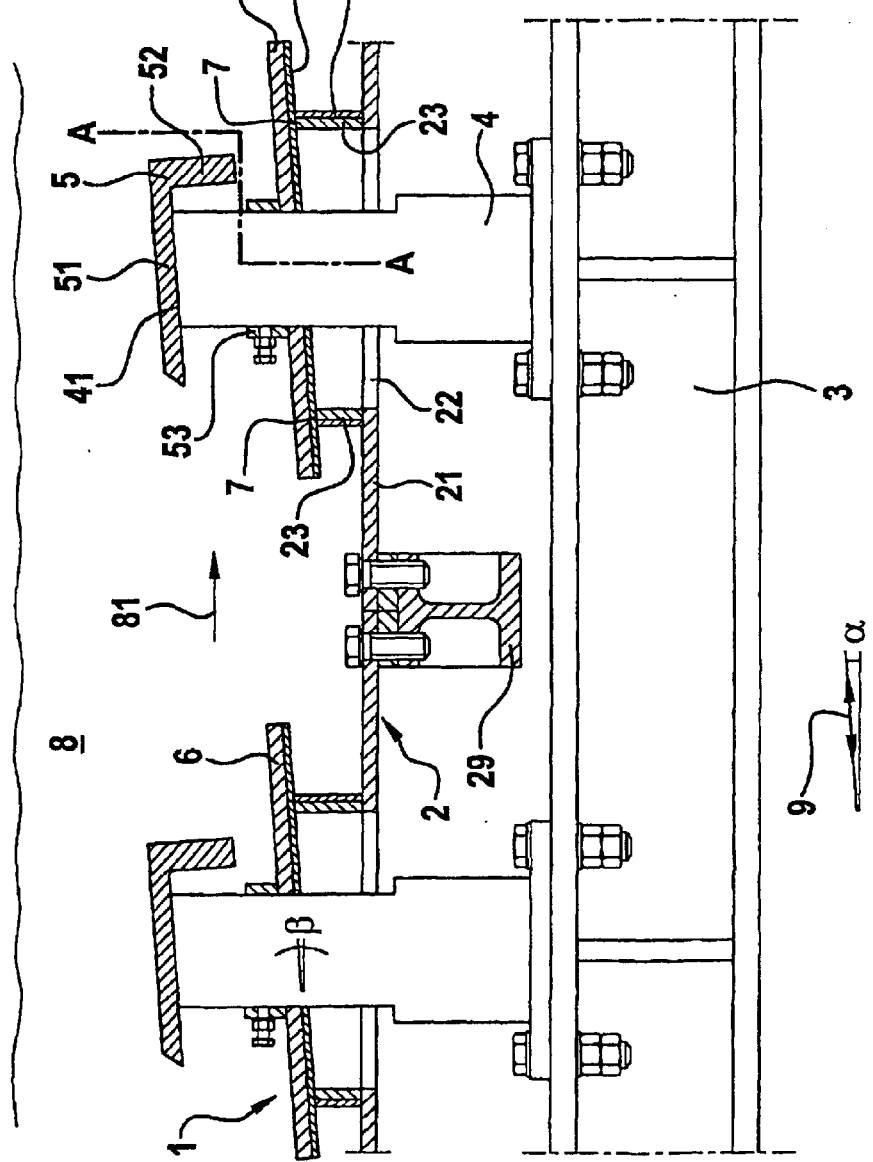
FIG. 1 shows a sectional view of a cooling grate according to the invention, with a conveying system, according to a first exemplary embodiment of the invention.

FIGS. 1 and 2 illustrate sectional views through part of a cooling grate according to the invention, which is designated 1 overall. It comprises a carrying plate 2, which is fastened on a plurality of crossmembers 29. The carrying plate 2 is made up of a plurality of plate elements 21, which are fastened on the cross members 29 in each case by way of their opposite ends. A drive frame 3 is arranged beneath the carrying plate 2. Above the carrying plate 2, material for cooling 8 rests on the carrying plate 2. Pushers 5 are arranged above the carrying plate 2 and surrounded by the material for cooling 8. The arrangement of the pushers 5 and their connection to the drive frame 3 is described in more detail hereinbelow.

The pushers 5 have an approximately L-shaped configuration with a longer leg 51 and a shorter leg 52. The shorter leg 52 is thicker than the longer leg 51, since its outwardly oriented surface, when the pusher 5 moves in the direction of the plane of its longer leg 51, is the pushing surface, which acts on the material for cooling 8, and thus has to withstand increased loading.

The plate elements 21 have openings 22, on the border of which is arranged a collar 23, which is oriented upward into the bed of the material for cooling 8. The collar 23 fully encloses the openings 22. The front wall of the collar 23, as seen in the conveying direction 81, is higher than the rear wall, as seen in the conveying direction. On its side which is directed toward the material for cooling 8, the collar is provided with a plating 24 made of high-strength and wear-reducing material.

The drive frame 3 beneath the carrying plate 2 is mounted in a movable manner and connected to a drive (not illustrated). The latter sets the drive frame 3 in a reciprocating lifting movement, as is illustrated symbolically by the arrow 9. The direction of the lifting movement is inclined by the angle of elevation â out of the plane of the carrying plate 2. Fastened on a top side of the drive frame 3 are a plurality of pushing plates 4, which extend vertically upward. Each of the pushing plates 4 extends, through one of the openings 22 in the carrying plate 2, onto that side of the carrying plate 2 which is subjected to the action of material for cooling 8. One of the pushers 5 is arranged at the top end of the pushing plate 4. For this purpose, the pushing plate 4 has, at its top end, an oblique slope 41, with the result that the plane which is formed by the oblique slope 41 is located parallel to the plane of the lifting movement 9. The pusher 5 rests on this oblique slope 41 by way of the inside of its longer leg 51, to be precise such that the shorter leg 52 of the pusher 5 is arranged in front of the longer leg 51, as seen in the conveying direction 81, and extends downward in the direction of the carrying plate 2.

A little above halfway up the height of the pushing plate 4, a cover plate 6 is fastened on the pushing plate 4. The cover plate 6 here is arranged on the pushing plate 4 at a setting angle â in relation to the horizontal plane of the carrying plate 2, with the result that it is located parallel to the upper slope 41 of the pushing plate 4 and thus also parallel to the direction of the lifting movement 9. The cover plate 6 is dimensioned such that it rests on the collar 23, and it projects to the front, beyond the front wall of the collar 23, and to the rear, beyond the rear wall of the collar 23, at least to the extent where it rests on the walls of the collar 23 in each phase of the lifting movement. On its underside, the cover plate 6 has a plating 61 which consists of high-strength material which is favorable in terms of wear. Resting the cover plate 6 on the collar 23 results in a sealing surface being formed by the top border of the collar 23 and the plating 24, this sealing surface interacting with a mating sealing surface, which is formed by the plating 61 of the cover plate 6, and thus forming a seal 7.

The cover plate 6 itself has a central opening 62, the extent of which is selected to correspond to the cross section of the pushing plate 4. Arranged on the border of the opening 62 is a mount 63, by means of which the cover plate 6 is fastened on the pushing plate 4.

During operation, the drive (not illustrated) sets the drive frame 3 in a lifting movement, the direction 9 of which is inclined by the angle of elevation â in relation to the horizontal. The pushing plates 4, the pushers 5 and the cover plates 6 thus also move along this direction. The pushers 5 use their shorter leg 52 to push in front of them some of the material for cooling 8, and thus cause this material 8 to move in the conveying direction 81. In addition, at least that region of the material for cooling which is displaced by the leg 52 during its forward-travel movement is provided with a vertical direction component by the pushers. This results, on the one hand, in certain mixing of the material for cooling 8 and, on the other hand, in the material for cooling 8 which is displaced by the pusher 5 being easier to displace, since, as a result of the slightly upwardly directed movement, the material for cooling which is displaced in each case is raised up some way from the material for cooling 8 located therebeneath, and the frictional forces which are directed counter to the displacement are thus reduced.

On account of being inclined by the setting angle â, the cover plate 6, during the lifting movement, follows its own path, i.e. moves in its own plane, since it is arranged on the transmission member in a manner in which it is inclined by the same angle which is also enclosed by the lifting direction 9, as angle of elevation â, in relation to the plane of the carrying plate 2. All that is thus required is for the cover plate 2 to make its way through the material for cooling by way of its front side, as seen in the movement direction, i.e. by way of the front side during the forward travel and by way of the rear side during the rearward travel. It can thus be displaced relatively easily and, much more importantly, is only subjected to a low level of wear. The low level of wear is of particular importance in respect of the underside of the cover plate 6 with the plating 61 arranged there, which acts as mating sealing surface of the seal 7.

The exemplary embodiment which is illustrated in FIGS. 3 and 4 corresponds essentially to the exemplary embodiment which is illustrated in FIGS. 1 and 2. The same parts are thus provided with the same designations and will not be explained in detail. In the case of this exemplary embodiment, a clamping device 10 is arranged on the pushing plate 4. The clamping device has a retaining plate 101 which is arranged laterally, as seen in the conveying direction 81. The retaining plate 101 has an opening 102 through which a bolt 103 is guided. Also arranged on the retaining plate 101 is a spring 104, which extends downward from the retaining plate. The spring 104 is supported in the downward direction by a plate element 105 and a clamping nut 106 at the bottom end of the bolt 103. The abutment for the spring 104 is formed by the underside of the retaining plate 101. The bolt 103 extends through the interior of the spring 104, the opening 102 in the retaining plate 101 and continues upward, beyond the latter, through a screw-hole 64 in the cover plate 6. The screw-hole 64 has a recess which is formed for accommodating a head of the bolt 103.

The clamping device is actuated as follows: With the cover plate 6 resting on the collar 23, the bolt 103, plugged through the cover plate 6 and the retaining plate 101 and also the spring 104, is clamped by rotation of the clamping nut 106, which moves the plate element 105 in the direction of the retaining plate 101. In order for the cover plate 6 to rest symmetrically on the collar 23, a corresponding clamping device is arranged on the opposite side of the pushing plate 4; it is clamped in the same way. The cover plate 6 is drawn against the collar 23 by the force of the spring 104; nevertheless, rather than being rigid, it can move, overcoming the force of the spring 104 in the process. In this way, it is possible to compensate for inaccuracies in respect of the angle of elevation á of the lifting movement and the setting angle â, at which the cover plate 6 is fastened on the pushing plate 4. Such tolerance-induced deviations may occur, in particular, as a result of the penetration of contaminants such as dust of the material for cooling in the region of the seal 7, and also as a result of different thermal expansions of the pushing plate 4 and of the collar 23.

In order to improve the seal 7 between the collar 23 and the cover plate 6, resilient plates 25 are arranged on the top region of the collar 23, said resilient plates butting with sealing action against the plating 61 of the cover plate 6. The seal 7 is thus protected against the ingress of material for cooling 8, with the result that the seal 7 wears to a lesser extent and thus seals more effectively.

FIGS. 5 and 6 illustrate a third exemplary embodiment of the invention. It corresponds essentially to the first and second exemplary embodiments. The same elements have the same designations, and their construction and functioning will thus not be explained in any more detail hereinbelow. The third exemplary embodiment differs from the first and second exemplary embodiment predominantly in that the collar 23 and the resilient plates 25 are configured integrally as a resilient collar 27. This simplifies the production of the arrangement since a smaller number of parts is required. Since the resilient plates are regularly subjected to a certain amount of wear, it is expedient for the single-piece configuration to be fastened in an exchangeable manner on the carrying plate 2 by means of screws 28.

Alternative types of configuration for the pushers 5 are also illustrated in FIGS. 5 and 6. In the case of the pusher 205, which is illustrated on the left-hand side in FIG. 5, the short leg 252, which is oriented downward toward the carrying plate 6, is longer than in the configuration according to the first exemplary embodiment, to be precise to the extent where it extends as far as the cover plate 6. In the example illustrated, a small gap remains between the bottom end of the shorter leg 252 and the top side of the cover plate 6. This provides sufficient space for temperature expansions of the pusher, in particular of the shorter leg 252.

In the case of the pusher 305, which is illustrated on the right-hand side in FIG. 5, both legs, the longer leg 351 and the shorter leg 352, are longer than in the case of the pusher 5 according to the first exemplary embodiment. The shorter leg 352 extends downward, as does the leg 252 of the pusher 205, as far as the cover plate 6. In contrast to the pusher 205, however, the bottom end of the shorter leg 352 is oriented flush with the front border of the cover plate 6, as seen in the conveying direction, and is fastened thereon at this location. This produces, between the pusher 305 and the cover plate 6, a space which is open merely toward the rear side, as seen in the conveying direction. During the forward travel of the pusher 305, it is no longer possible for material for cooling 8 to pass out of the region in front of the shorter leg 352 into the region behind the same. During the forward travel, there is thus a free space between the pusher 305 and the cover plate 6 which is not filled with material for cooling 8. This has the advantage that it is no longer necessary for any material for cooling 8 to be pushed away by the leg 35.2 of the pusher 305 during rearward travel.

A fourth exemplary embodiment of the invention is illustrated in FIG. 4. The cooling grate 1' comprises a carrying plate 2' and a conveying system with a drive frame 3', push rods 4' as transmission members, and pushers 5'.

The carrying plate 2' is formed from a plurality of plate elements 21'. They are fastened on a plurality of I-shaped cross members 29'. The plate elements 21' have an approximately central opening 22' which runs obliquely from bottom to top in each case and is bounded by a likewise obliquely running bushing 23' as collar. The push rods 4' are mounted in the openings 22' of the bushings 23'. The dimensions of the push rods 4' are coordinated with the extent of the openings 22' such that the push rods 4' are guided by the bushings 23'. At their bottom end, the push rods 4' are connected to the drive frame 3'. The drive frame is connected to a drive (not illustrated) which sets it in a lifting movement, as is illustrated symbolically by the arrow 9'. The direction 9' is inclined by the angle of elevation á' in relation to the horizontal plane of the carrying plate 2'. It can be seen that the push rods 4' and likewise the bushings 23' are in-lined by a setting angle â' in relation to the horizontal, the setting angle â' being equal to the angle of elevation á'. In this way, the push rods 4' follow their own path during the lifting movement.

Seal packings 7' are arranged on the upwardly oriented border of the bushings 23' and act with sealing action between the bushing 23' and the push rod 4'. An L-shaped pusher 5' is arranged in each case at the top end of the push rods 4'. The pusher has a longer leg 51', which is arranged parallel to, and at a spacing from, one longitudinal side of the push rod 4'. The pusher 5' has its shorter leg 52' fastened on an end side 41' of the push rod 4'.

Instead of providing the drive frame 3' as a common drive for the pushers 5', it is also possible to provide independent individual drives. Although this involves higher outlay, it provides advantages in respect of the pushers 5' moving in a manner in which they are controlled independently of one another. The drive which is provided in one configuration which has proven successful is formed by hydraulic cylinders which have a piston rod simultaneously forming the push rod 4'.

During operation, the drive frame moves in the direction of the arrow 9'. This movement is transmitted, via the push rods 4', to the pushers 5', which thus execute a lifting movement. As is also the case with the exemplary embodiments 1 to 3, the seal packing 7' between the bushing 23', acting as collar, and the push rod 4', acting as transmission member, ensures that it is not possible for any material for cooling 8 to penetrate into the space of the opening 22', thus falling through into the space beneath the carrying plate 2'. Since the bushing 23' is inclined by the same setting angle â' as the lifting movement is inclined, as angle of elevation á', in relation to the horizontal, this achieves the situation where the spacing which is to be sealed by the seal packing 7' between the bushing 23' and the push rod 4' remains constant throughout the lifting movement.

What is claimed is:

1. A cooling grate for bulk material, comprising:
   a carrying plate (2) for accommodating a layer (8) of the material for cooling,
   conveying elements configured for transporting the material for cooling in a conveying direction on the resting carrying plate and comprising pushers arranged in a movable manner on one side of the carrying plate which is subjected to the action of material for cooling and a drive which is arranged on the other side of the carrying plate and a reciprocating lifting movement to the pushers,
   the carrying plate having openings formed therein assigned to each pusher and each pusher being assigned a transmission member which is guided thereby and connects the pusher to the drive
   the openings each having a collar which at least at the front and rear, as seen in the conveying direction, has a seal acting between the transmission member and collar.

2. The cooling grate as claimed in claim 1, wherein the drive is configured to provide the lifting movement in a direction which is inclined by an angle of elevation $\alpha$ to the plane of the carrying plate.

3. The cooling grate as claimed in claim 1 or 2, wherein the seal is formed by a border of the collar (23) and the cooling grate further comprises a cover plate arranged on the transmission member and inclined to the plane of the carrying plate by a setting angle $\beta$ which is equal to the angle of elevation $\alpha$.

4. The cooling grate as claimed in claim 3, further comprising a clamping device on the transmission member to brace the cover plate with the collar.

5. The cooling grate as claimed in claim 4, further comprising resilient seals arranged on the collar which interact with the cover plate.

6. The cooling grate as claimed in claim 3, further comprising resilient seals arranged on the collar which interact with the cover plate.

7. The cooling grate as claimed in claim 2, wherein the collars (23') are inclined to the pane of the carrying plate by a setting angle $\beta$, which is equal to the angle of elevation $\alpha$, and one of the transmission members is guided in a longitudinally movable manner in one of the collars.

8. The cooling grate as claimed in claim 7, further comprising a seal packing on the collar which interacts with the transmission member.

* * * * *

UNITED STATES PATENT AND TRADEMARK OFFICE
CERTIFICATE OF CORRECTION

PATENT NO. : 6,920,702 B2
DATED : July 26, 2005
INVENTOR(S) : Hartmut Meyer et al.

It is certified that error appears in the above-identified patent and that said Letters Patent is hereby corrected as shown below:

Column 9,
Line 22, change the word "plate and a reciprocating" to -- plate and is intended for executing a reciprocating --.

Signed and Sealed this

Eighth Day of November, 2005

JON W. DUDAS
*Director of the United States Patent and Trademark Office*